No. 784,842. PATENTED MAR. 14, 1905.
C. R. DAVIS.
FOOT LIFT FOR PLOWS.
APPLICATION FILED DEC. 31, 1904.
3 SHEETS—SHEET 1.
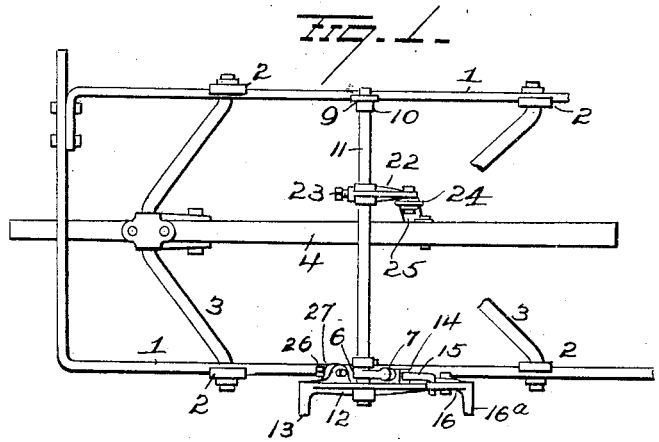
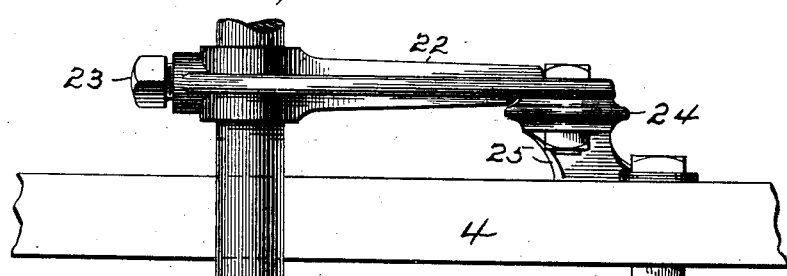
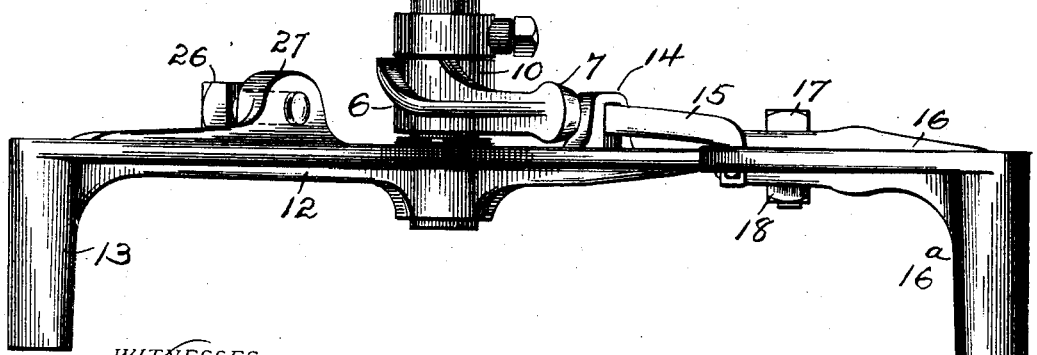
WITNESSES
E. Nottingham
G. F. Downing
INVENTOR
C. R. Davis
By H. A. Seymour
Attorney

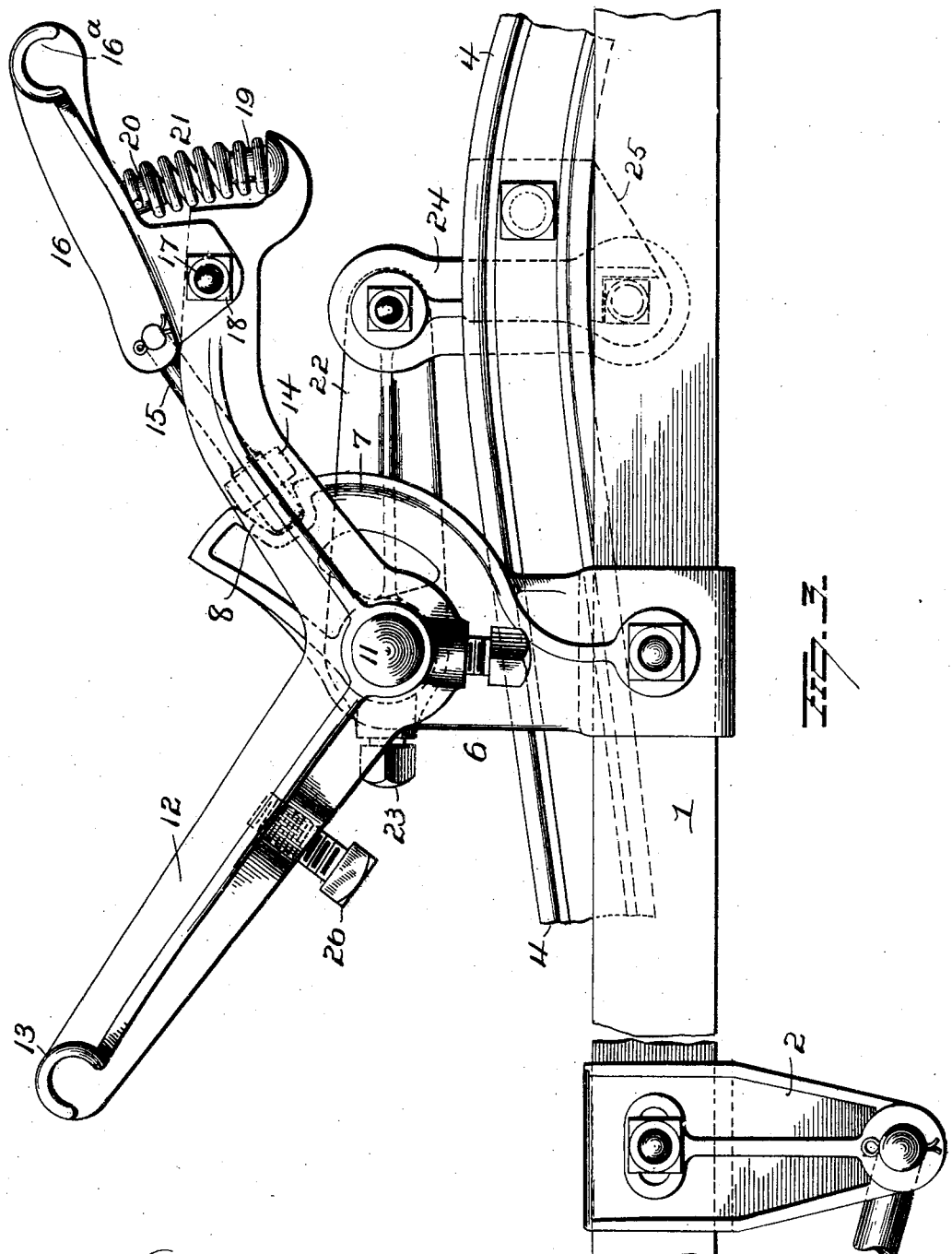

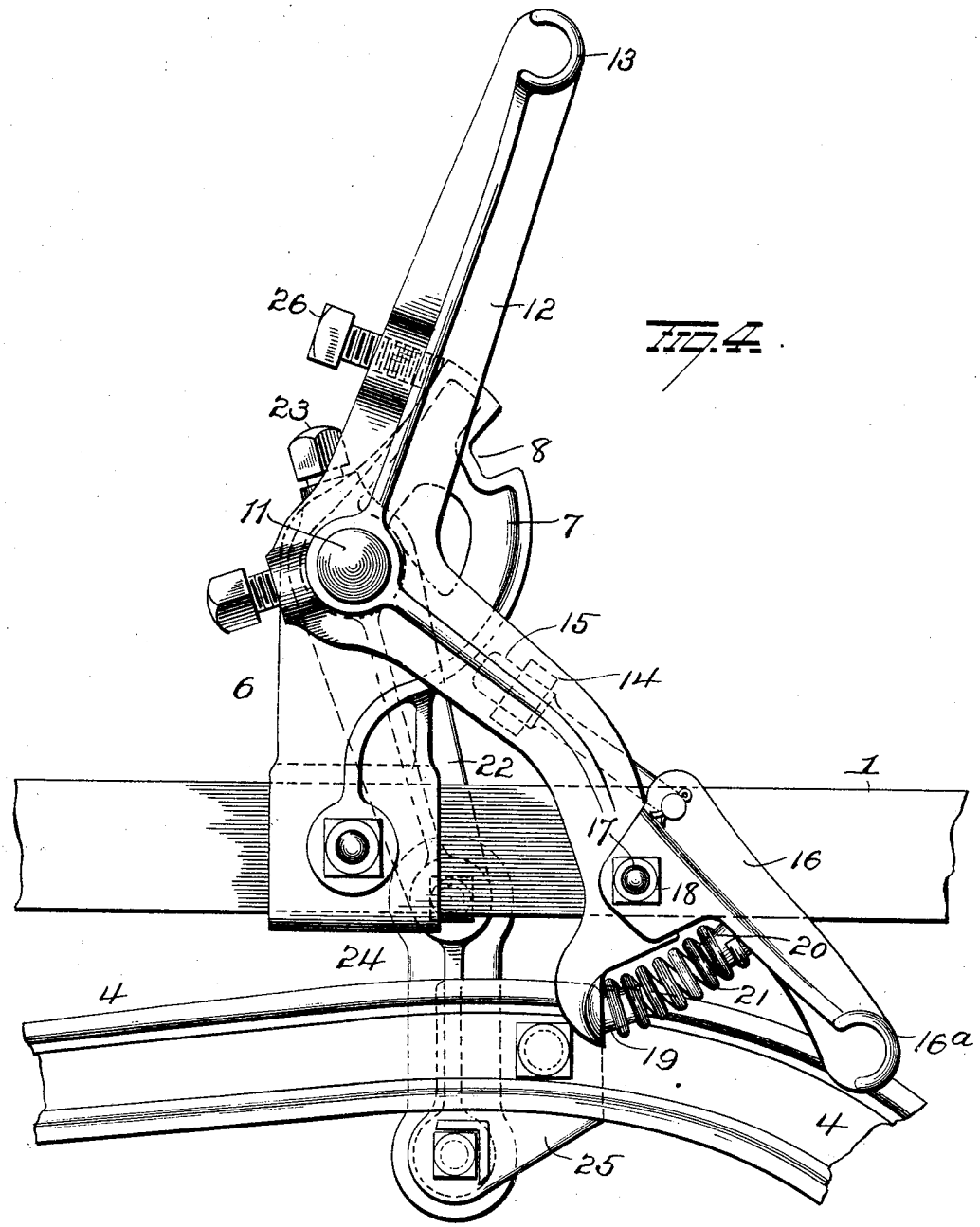

No. 784,842.

Patented March 14, 1905.

UNITED STATES PATENT OFFICE.

CALVIN R. DAVIS, OF SOUTH BEND, INDIANA, ASSIGNOR TO OLIVER CHILLED PLOW WORKS, OF SOUTH BEND, INDIANA.

FOOT-LIFT FOR PLOWS.

SPECIFICATION forming part of Letters Patent No. 784,842, dated March 14, 1905.

Application filed December 31, 1904. Serial No. 239,222.

*To all whom it may concern:*

Be it known that I, CALVIN R. DAVIS, a resident of South Bend, in the county of St. Joseph and State of Indiana, have invented certain new and useful Improvements in Foot-Lifts for Plows; and I do hereby declare the following to be a full, clear, and exact description of the invention, such as will enable others skilled in the art to which it appertains to make and use the same.

My invention relates to an improved foot-lift for plows, the object of my invention being to improve upon the construction disclosed in Patent No. 762,516, granted to me June 14, 1904; and it consists in certain novel features of construction and combinations and arrangements of parts, as will be more fully hereinafter described, and pointed out in the claims.

In the accompanying drawings, Figure 1 is a top plan view illustrating my improvements. Fig. 2 is an enlarged fragmentary plan view; and Figs. 3 and 4 are enlarged views, in side elevation, illustrating the parts in different positions.

1 represents the parallel side bars of the frame, supported on wheels and having depending arms 2 secured thereto. To these arms crank-shafts or U-frames 3 have rotary mounting at their ends and are connected between their ends with a plow-beam 4, and it is to be understood that a gang of plows may be provided, if preferred.

A cast-metal bracket 6 is secured to one side bar 1, projects upward therefrom, and is made with an integral segment 7, having a notch 8 therein. A bracket 9 is secured to the other side bar 1 opposite a bracket 6, and both brackets are provided with bearings 10 for a shaft 11, extending across the frame and projecting out beyond bracket 6. To this protruding end of shaft 11 my improved foot-lever 12 is secured between its ends and is provided at its forward end with a laterally-projecting integral foot-rest 13.

Near the rear end of lever 12 a perforated lug 14 is provided and serves as a guide for a detent 15, which latter is connected at one end with a foot-lever 16. This foot-lever 16 is bifurcated to receive lever 12 and is pivotally secured to said lever by a cross-bolt 17, passed through the levers and secured by a nut 18. The extreme end of lever 12 has an upright lug 19, and the lever 16 has a depending lug 20 above lug 19, said lugs 19 and 20 being projected into the opposite ends of a coiled spring 21, which exerts upward spring-pressure on lever 16 and presses the detent 15 against the edge of segment 7 and firmly holds the detent 15 in the notch 8 of said segment until the foot-rest 16ª on lever 16 is depressed by the operator's foot.

On shaft 11 a crank-arm 22 is adjustably secured by a set-screw 23 and connected at its end by a link 24 with a bracket 25, secured to the plow-beam 4, and it is to be understood that a crank-arm 22, link 24, and a bracket 25 may be provided with each and every plow-beam or not, as may be preferred.

The operation of my improvements is as follows: To lower the plow-bases, the operator by a kick or pressure on lever 16 withdraws the detent 15 from notch 8 in segment 7 and permits the plow-bases of their own weight to fall, and by pressure on foot-rest 16ª the plow-bases can be forced into the ground. A set-screw 26 is located in a lug 27 in lever 12 and is adapted to engage the end of segment 7 to limit the downward movement of the plow-bases, and said screw 26 can be adjusted to suit varying conditions.

When it is desired to elevate the plow-base, the operator presses against foot-rest 13, which turns shaft 11, raising arms 22, which, through the medium of links 23 and brackets 24, elevates the plow-bases, and when they are raised to the proper height the detent 15 will spring into notch 8 and hold the parts in such position.

By constructing my improvements as above explained the crank-arms 22 can be adjusted on shaft 11, so as to secure a direct upward lift on the plow-bases, and can be adjusted to secure the proper movement of the same.

A great many slight changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a plow, the combination with a frame, of a shaft extending across the frame, a crank-arm adjustably secured on the shaft, a plow-beam carrying plow-bases, a link connecting the crank-arm with said beam, a foot-lever secured between its ends on said shaft, a spring-pressed detent on said lever to lock the latter in one position and a foot-lever on the first-mentioned lever to operate said detent.

2. In a plow, the combination with a frame, of brackets secured to opposite sides of said frame, a notched segment on one of said brackets, a shaft supported in the brackets, a crank-arm adjustably secured on the shaft and connected with a plow-beam, a foot-lever secured between its ends on the shaft, a small foot-lever pivoted to the first-mentioned foot-lever, a detent connected with the smaller foot-lever, a spring between the levers forcing the detent into engagement with the segment to compel the detent to spring into a notch in the segment and hold the plow-bases elevated, and a set-screw carried by the larger lever adapted to engage the end of the segment and limit the downward movement of the plow-bases.

In testimony whereof I have signed this specification in the presence of two subscribing witnesses.

CALVIN R. DAVIS.

Witnesses:
 EDWIN NICAR,
 HAROLD R. BEALE